United States Patent

[11] 3,595,590

| [72] | Inventor | Horst Beyer<br>Burscheid, Germany |
|---|---|---|
| [21] | Appl. No | 835,645 |
| [22] | Filed | June 23, 1969 |
| [45] | Patented | July 27, 1971 |
| [73] | Assignee | Goetzewerke Friedrich Goetze<br>Aktiengesellschaft<br>Burscheid, Germany |
| [32] | Priority | June 21, 1968 |
| [33] | | Germany |
| [31] | | P 17 51 573.0 |

[54] PISTON RING
9 Claims, 7 Drawing Figs.

| [52] | U.S. Cl. | 277/235 R |
|---|---|---|
| [51] | Int. Cl. | F16j 9/00 |
| [50] | Field of Search | 277/235, 236, 227, 224, 208, 217 |

[56] References Cited

UNITED STATES PATENTS

| 2,554,289 | 5/1951 | Anderson | 277/235 A |
| 2,565,042 | 8/1951 | Phillips | 277/235 A |
| 2,807,511 | 9/1957 | Fleming | 277/235 A |
| 2,905,512 | 9/1959 | Anderson | 277/208 X |

FOREIGN PATENTS

| 930,089 | 7/1963 | Great Britain | 277/235 A |

*Primary Examiner*—Robert I. Smith
*Attorney*—Spencer & Kaye

ABSTRACT: The outer surface of a support ring is first provided with a protrusion, for example by grinding down protrusion-adjacent parts of the surface. Then the entire outer surface is coated with a hard chrome layer of substantially uniform thickness. Finally, depressions in the chrome are filled with molybdenum. The sliding-friction resistant properties of molybdenum are thus combined with the wear-resistant properties of chromium into a mechanical unit capable of withstanding rough usage.

PATENTED JUL27 1971

3,595,590

INVENTOR
HORST BEYER

BY Spencer & Kaye

ATTORNEYS

PISTON RING

BACKGROUND OF THE INVENTION

The present invention relates to a piston ring whose cylinder-contacting surface has axially arranged bands of a wear resistant material such as chromium and a sliding-friction resistant material such as molybdenum.

Molybdenum surfaces on piston rings have less tendency than other surfaces to develop pitting. However, molybdenum surfaces are not as resistant to wear as are surfaces of, for example, hard chromium.

Piston rings having an insert ring on which a chromium surface has been applied are already known. Furthermore, attempts have been made to plate a hard-chrome surface on piston rings and then too over this hard-chrome surface with soft chromium, or tin. Unfortunately, the bonding of the softer material to the smooth hard-chrome layer has been unsatisfactory. Thus, instead of serving as a run-in surface, it has been found frequently that the soft material layer was lost on the first stroke of the piston.

As a result of this experience, run-in surfaces have been imbedded in one or more grooves on the chrome-plated surface of a piston ring. Such grooves have extended through to the basic piston ring material, so that a strong bonding of the run-in material to the base material was achieved. It is also known to make the run-in surface of molybdenum or titanium and to extend such material axially so that it entirely covers the chromium layer. However, then the different materials are not utilized at the same time but only one after the other.

In extreme conditions of operation such as occur in high-speed diesel engines it is known to provide the outer surface of the ring with a chromium plating, to groove this plating, and to provide in this groove a filling of molybdenum Here the good wear properties of a chromium-plated ring are paired with the high resistance of molybdenum to pitting. Danger of galling is highly reduced and piston ring life increased.

Finally, piston rings with edge bands of chromium or molybdenum and having a central band of the basic material of the ring are known. The central band may be convex, concave, or planar.

SUMMARY OF THE INVENTION

It is an object of the invention to provide a more efficient construction for piston rings having two different materials in their running surface. Another object is to provide a construction that will better withstand rough usage.

These as well as other objects which will become apparent in the discussion that follows are achieved, according to the present invention by providing a radial protrusion on the outer surface of a support ring, by coating the outer surface with a layer or wear-resistant material of substantially uniform thickness, and placing sliding-friction resistant material in resulting depressions on the wear-resistant material.

DESCRIPTION OF THE PREFERRED EMBODIMENTS

Figure 1:
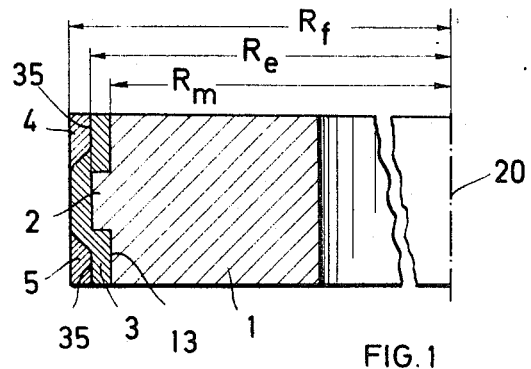
FIG. 1 is a section of a piston ring according to the invention, the section plane including the axis of the ring.

The support ring 1 of the piston ring of FIG. 1 has a central protrusion 2 projecting radially relative to piston ring axis 20 outwards on its outer surface 13, thus creating depressions 35 of constant and equal radius $R_m$. Provided on this outer surface is a substantially uniformly thick layer 3 of hard chromium, a wear-resistant material. On either side of the protrusion 2, the depressed portions of the hard chrome have been built up with layers 4 and 5 of molybdenum, a sliding-friction resistant material.

Figure 2:
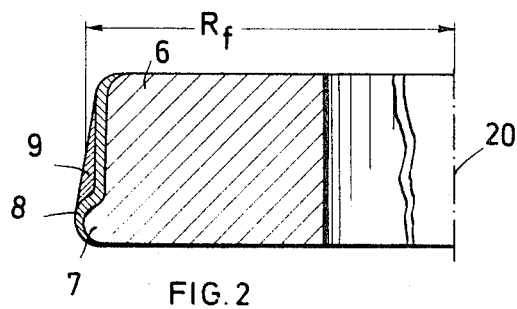
FIG. 2 is a section as in FIG. 1 of a second piston ring according to the invention.
Figure 5:
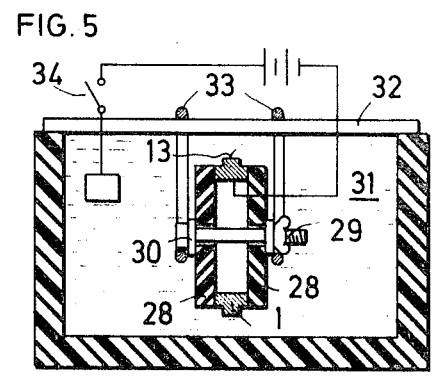
FIG. 5 is a partially schematic, partially sectional elevation of an electroplating apparatus.

The support ring 6 of FIG. 2 exhibits a radial protrusion 7 at its lower edge. The outer surface of this support ring has been coated with a layer 8 if chromium of substantially uniform thickness, and the depressed region of the chrome layer adjoining that on protrusion 7 is provided with a layer 9 of molybdenum.

Figure 3:
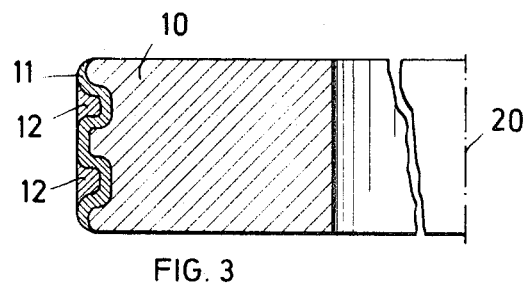
FIG. 3 is a section as in FIG. 1 of a third piston ring according to the invention.

In FIG. 3, the support ring 10 has a wave-shaped profile with three protrusions on its outer surface. The resulting depressions in the hard-chrome layer 11 are filled with molybdenum layers 12.

Figure 4:
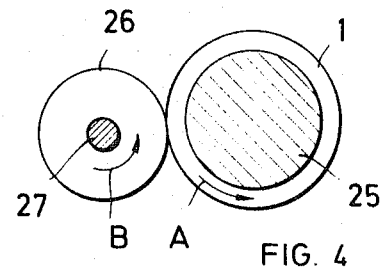
FIG. 4 is a section through grinding apparatus, the section plane being perpendicular to the rotation axes.

As an example of making the piston rings of the invention the cast iron support ring 1 of radius $R_e$=44 mm. is mounted in FIG. 4 on a spindle 25 securely, so that with the spindle mounted in a lathe, spindle and support ring rotate in unison in the direction of arrow A. Then, grinding wheel 26 rotating on shaft 27 in the direction of arrow B is brought against the rotating support ring to form protrusion 2 by grinding down the outer surface 13 on either side of the protrusion 2. The difference $R_2-R_m$ in FIG. 1 equals 1.5 mm.

The composition of the cast iron of the support ring is as follows:

| | |
|---|---|
| 3.8 % C | 0.4 % P |
| 2.7 % Si | remainder Fe + trace elements |
| 0.6 % Mn | |
| 0.1 % Cr | |

The cast iron support ring 1 is then prepared for plating on its outer surface 13 by turning.

The support ring 1 is then clamped between plastic plates 28 by bolt and wing nut 29. Rubber washers 30 are provided to seal the interior of the ring from the plating solution 31, whose composition is

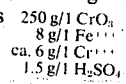

and whose temperature is 58° C.

Upon hanging the assembly in the plating solution using rod 32 and hooks 33, switch 34 is closed for about 5 hours, during which time the current density at the outer surface 13 is 50 Amp./dm.². The anode is made of lead. This places a hard chrome layer 3 of thickness 0.2 mm. on the outer surface 13.

After washing all remnants of plating solution from the now chrome plated support ring, and drying, the hard chrome surface is roughened by sand blasting using as sand corundum, silicon carbide, or diamond dust. The support ring is then ready for application of Mo, as a sliding-friction resistant material, in the depressions 35 of the hard chrome surface. The roughening enables a better bonding of the Mo and provides oil catching pockets in any finally exposed chromium. A preferred surface roughness is circa 20 Rt.

Figure 6:
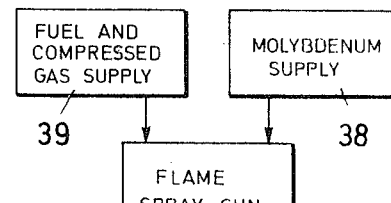
FIG. 6 is a schematic illustration of a flame-spraying process.

FIG. 6 shows the chrome-plated support ring 1 mounted for rotation with spindle 36. Spindle 36 is mounted at its ends in any conventional means to effect its rotation. The tangential surface velocity $v_t$ of the support ring 1 is 50 meters per minute. The thickness $t$ of the support ring is 4.5 mm.

The flame spray gun 37 is fed by a molybdenum supply 38 and a fuel and compressed gas supply 39.

The nozzle cone angle of the gun 37 and its distance from the surface of the support ring 1 are chosen to maximize uniformity of deposition while minimizing losses due to missing of the ring and subsequently required finish grinding. Such considerations are well known in the art.

The flame spray gun 37 blows atomized molten molybdenum onto the chrome surface of the support ring 1. The composition of the fuel is a mixture of acetylene and oxygen in such proportions that the flame is nearly neutral, i.e., neither oxydizing nor reducing. It is burned with oxygen as oxidant at zero percent by weight excess oxygen.

Figure 7:
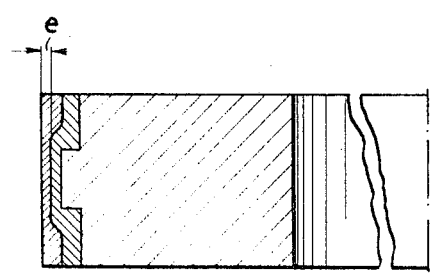
FIG. 7 is a section as in FIG. 1 of the piston ring of FIG. 1 before its manufacture is complete.

The entire surface of molybdenum is applied in six passes of the support ring. The molybdenum is allowed to build up an excess thickness $e$ (FIG. 7) of about 0.2 mm. over the chromium on the protrusion 2, in order that depressions 35 become completely filled. This extra thickness is subsequently removed to yield the finished piston ring of FIG. 1 by a grinding operation similar to that depicted in FIG. 4. This final grinding assures that at the abutment between the exposed faces of Cr and Mo the exposed-face radius is continuous in passing from the Mo face to the Cr face or vice versa, as opposed to a discontinuous behavior which would be present if a ledge existed at the abutment. This continuous behavior is important in preventing failure by separations of the Mo and Cr at the abutment. The exposed-face radius $R_f$ is a constant in FIG. 1, while it varies as a function of axial distance in FIG. 2, the variation of $R_f$ in FIG. 2 at the Mo-Cr abutment nevertheless being continuous.

The spraying of FIG. 6 is carried out in an atmosphere of air.

It will be apparent to one skilled in the art that the above example is capable of certain variations. Thus, depending on the particular application of the piston ring, the hard-chrome layer can be replaced by a hard-nickel layer, and the surface of wear-resistant material can be roughened by a chemical etching process before application of the sliding-friction resistant surface, instead of using a sand blasting operation.

The success of the piston ring of the present invention in overcoming the disadvantages of the prior art soft layer upon hard layer, where the soft layer was in danger of being lost even on the first piston stroke, is attributed partly to the properties of molybdenum, partly to the roughening of the chromium layer, and partly to the mechanical locking provided by the protrusion on the outer surface of the support ring.

It will be understood that the above description of the present invention is susceptible to various modifications, changes and adaptations.

I claim:

1. A piston ring comprising a support ring having an outer surface provided with a radial protrusion whereby part of the outer surface is radially depressed relative to said protrusion, a layer of wear-resistant material coating the outer surface of said support ring, said layer of wear-resistant material having a substantially uniform thickness whereby its outer surface is a replica of the outer surface of said support ring, and a layer of sliding-friction resistant material coating said layer of wear-resistant material in its radially depressed part.

2. A piston ring as claimed in claim 1, said protrusion being centrally located in the outer surface of said support ring, the depressed part of the outer surface being of constant equal radius.

3. A piston ring as claimed in claim 1, the depressed part of the outer surface being of constant and equal radius, said layers of wear-resistant material and sliding-friction resistant material having exposed faces of constant radius.

4. A piston ring as claimed in claim 1, said protrusion located at an edge of the support ring.

5. A piston ring as claimed in claim 1, said sliding-friction resistant material coating said layer of wear-resistant material on a roughened face thereof.

6. A piston ring as claimed in claim 1, said wear-resistant and sliding-friction resistant layers having exposed faces, the radii of which are constant across their abutment.

7. A piston ring as claimed in claim 1, said wear-resistant and sliding-friction resistant layers having exposed faces, the exposed-face radius being continuous in passing from the wear-resistant layer to the sliding-friction resistant layer or vice versa.

8. A piston ring as claimed in Claim 1, said sliding-friction resistant layer being molybdenum.

9. A piston ring as claimed in claim 8, said wear-resistant layer being chromium.